W. S. ANDRES & P. MEYER.
BELT FASTENER.
APPLICATION FILED OCT. 23, 1909.
1,033,774.
Patented July 30, 1912.
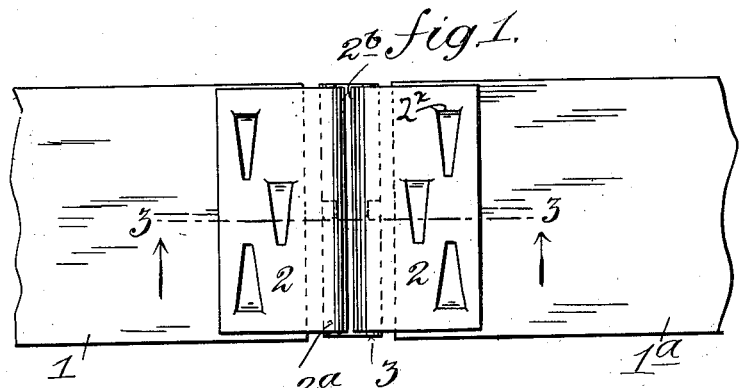
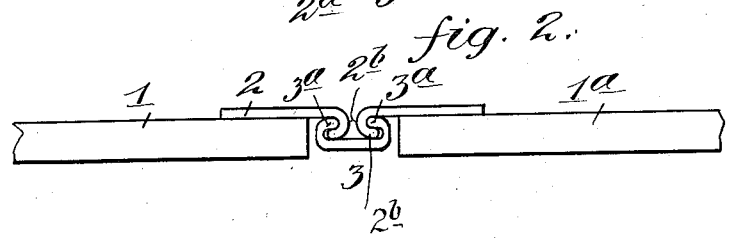
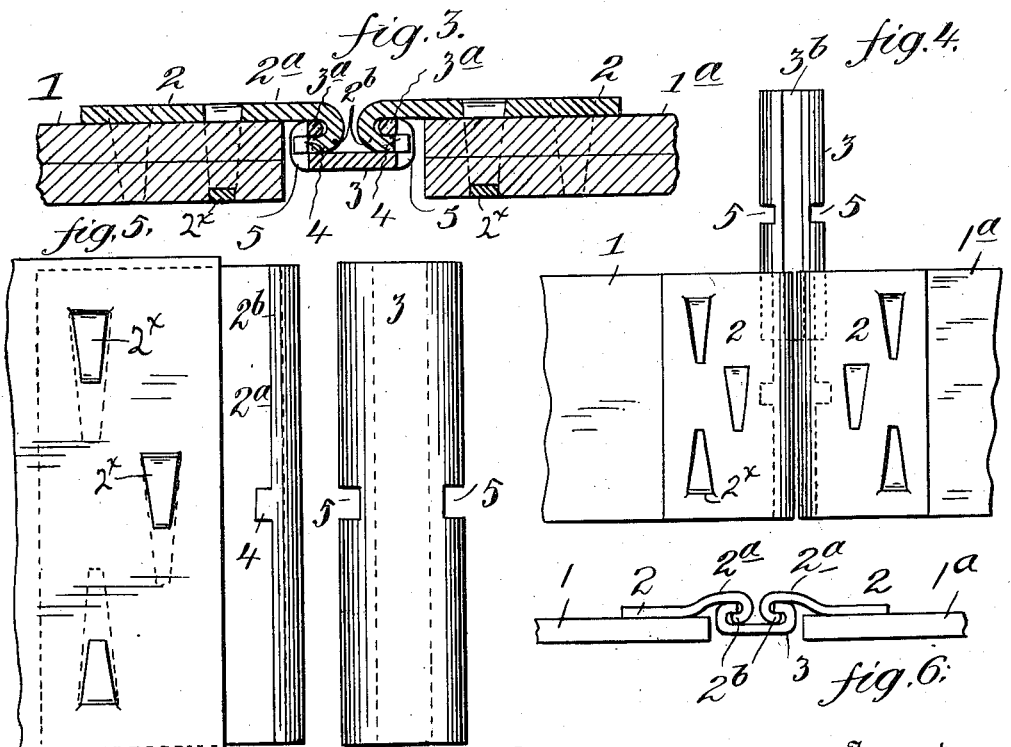
Inventor
W. S. Andres & P. Meyer.
By Attorney
P. F. Bourne

UNITED STATES PATENT OFFICE.

WILLIAM S. ANDRES AND PETER MEYER, OF NEWARK, NEW JERSEY, ASSIGNORS TO SNAP DETACHABLE BELT FASTENER CO., OF NEWARK, NEW JERSEY, A CORPORATION OF NEW JERSEY.

BELT-FASTENER.

1,033,774.   Specification of Letters Patent.   Patented July 30, 1912.

Application filed October 23, 1909. Serial No. 524,147.

*To all whom it may concern:*

Be it known that we, WILLIAM S. ANDRES and PETER MEYER, citizens of the United States, and residents of Newark, in the county of Essex and State of New Jersey, have invented certain new and useful Improvements in Belt-Fasteners, of which the following is a specification.

The object of our invention is to provide improved means for detachably connecting together the ends of belts used for driving machinery, and for detachably connecting together other articles.

In carrying out our invention we provide plate-like members having jaws at their edges adapted to receive jaws upon an intermediate connecting piece, and means for attaching said members to the adjacent ends of belts or other articles, whereby when the jaws of said members and of said intermediate piece are interlocked the ends of the belt or the like will be movably connected together. To retain the intermediate piece in connection with said members at the ends of the belt we provide interlocking devices serving to prevent relative endwise movement of the parts of the fastener.

Our invention also comprises the novel details of improvement and combinations of parts that will be more fully hereinafter set forth and then pointed out in the claim.

Reference is to be had to the accompanying drawings forming part hereof, wherein, Figure 1 is a plan view illustrating our improvements in use; Fig. 2 is an edge view thereof; Fig. 3 is an enlarged detail section on the line 3, 3, in Fig. 1; Fig. 4 is a plan view illustrating the manner of connecting the parts together; Fig. 5 is an enlarged inverted plan view; Fig. 5$^a$ is a similar view of the intermediate connecting piece, and Fig. 6 is an edge view illustrating our improvements in use in connection with a relatively thin belt.

In the drawing the numerals 1, 1$^a$ indicate the adjacent end portions of a belt adapted for driving machinery, and at 2 are the belt fastening members which are shown in the form of plates attached to the end portions of the belt and having extending parts 2$^a$ provided with hooked edges 2$^b$ which are shown formed by curving the edge portions of the metal plate members reversely, the members 2 being attached to the belt in such manner that the hooks project beyond and between the adjacent ends of the belt, with the hooks facing inwardly or toward the wearing side of the belt. We have shown the members on plates 2 provided with lugs 2$^x$ for securing said plates to the belt; and in practice, the plates are secured on the upper side of the belt; that is, to the sides opposite the surface which contacts with the machine-pulley on which it travels. At 3 is an intermediate piece having jaws 3$^a$ on opposite sides adapted to interlock with the hooks 2$^b$ to connect the latter together. The connecting piece 3 is shown in the form of sheet metal having its jaws 3$^a$ formed by curving the edges of the metal toward each other, thereby providing an interposed space. The relative arrangement of the parts is such that when the ends of the belt are brought together with the hooks 2$^b$ adjacent, and the plates 2 at a proper relative angle, the connecting piece 3 may be slid along in a longitudinal direction to interlock with the hooks 2$^b$, as indicated in Fig. 7, whereby the members 2 will be locked together, and will have freedom of movement with respect to the connecting piece 3. The inner edges of the opposing jaws 3$^a$ are of curved or convexed formation, and the hooks 2$^b$ are evenly curved to conform to these convexed edges, thereby providing a hinge joint or bearing on which the parts 2 and 3 have relative movement as the belt is alternately curved around a pulley and straightened between pulleys. To retain piece 3 in position respecting hooks 2$^b$, so that said piece will not slide laterally or transversely of the belt, we provide interlocking devices between piece 3 and hooks 2$^b$. For this purpose we have shown each of the hooks 2$^b$ adapted to enter recess 5 in the edges of connecting piece 3, whereby when the lugs 4 are in the recess 5 said lugs will contact with the edges of the recesses to prevent piece 3 from sliding laterally or transversely of the belt. The space between the jaws 3$^a$ is sufficient to enable relative movement laterally of either member 2 when said members are being connected with piece 3, to permit lug 4 to be pulled out of the recess 5 to enable the lug to slide along the corresponding jaw 3$^a$, yet when the belt is under strain, the lugs 4 will be maintained in their corresponding recess 5.

The fastening device will be of proper shape and dimensions so as not to interfere with the pulleys over which the belt runs, and where the belt is relatively thick the members 2 may be made flat as in Figs, 2 and 3. Where the belt is relatively thin the extended portions 2ª of the members 2 may be bent outwardly relatively to the belt, as indicated in Fig. 6, so that the connecting piece 3 will be above the line of the working face of the belt so as not to contact with the pulleys.

Having now described our invention what we claim is:

In combination with a machine-belt, a belt fastener comprising two similar and interchangeable plates having means thereon for securing them to the upper surfaces of the adjacent end portions of the belt, said plates each having an edge curved downwardly and inwardly toward an end of the belt and thereby forming hooks, located between the belt ends, a connecting piece having upwardly and inwardly turned hooks formed on two opposite edges thereof and disposed between the adjacent ends of the belt and engaging the hooks of said plates and thereby forming pivotal connections therewith and adapted to be disconnected therefrom by simple manipulation, and means for normally securing the connecting piece against lateral movement transversely of the belt.

Signed at Newark, in the county of Essex, and State of New Jersey this 14th day of October A. D. 1909.

WILLIAM S. ANDRES.
PETER MEYER.

Witnesses:
JOHN C. GROEL,
JOSEPHINE GROPP.